(12) United States Patent
Moore

(10) Patent No.: US 9,182,153 B2
(45) Date of Patent: Nov. 10, 2015

(54) BALL BEARING TRACKER ASSEMBLY

(71) Applicant: Luanne Moore, Boynton Beach, FL (US)

(72) Inventor: Luanne Moore, Boynton Beach, FL (US)

( * ) Notice: Subject to any disclaimer, the term of this patent is extended or adjusted under 35 U.S.C. 154(b) by 94 days.

(21) Appl. No.: 14/053,470

(22) Filed: Oct. 14, 2013

(65) Prior Publication Data

US 2014/0105673 A1 Apr. 17, 2014

Related U.S. Application Data

(60) Provisional application No. 61/714,745, filed on Oct. 17, 2012.

(51) Int. Cl.
*F16C 11/00* (2006.01)
*F24J 2/54* (2006.01)

(52) U.S. Cl.
CPC *F24J 2/54* (2013.01); *F24J 2/5431* (2013.01); *F24J 2002/5489* (2013.01); *Y02E 10/47* (2013.01); *Y10T 403/32737* (2015.01)

(58) Field of Classification Search
CPC ............. Y10T 403/32737; Y02E 10/47; F24J 2002/5489
USPC ........ 403/122, 135; 126/573, 600; 250/203.4; 353/3; 384/49, 494–496; 248/181.1
See application file for complete search history.

(56) References Cited

U.S. PATENT DOCUMENTS

| | | | |
|---|---|---|---|
| 1,044,771 A | 12/1913 | Gaskill | |
| 1,551,324 A | 4/1924 | Offerdahl | |
| 2,089,439 A * | 8/1937 | Silberstein | 248/181.1 |
| 2,971,770 A * | 2/1961 | Wagner | 280/124.134 |
| 4,172,739 A * | 10/1979 | Tassen | 136/246 |
| 4,295,621 A * | 10/1981 | Siryj | 248/183.2 |
| 5,076,412 A * | 12/1991 | Huber | 193/35 MD |
| 5,096,308 A * | 3/1992 | Sundseth | 384/49 |
| 5,538,346 A * | 7/1996 | Frias et al. | 384/49 |
| 5,871,186 A * | 2/1999 | Bothe et al. | 248/181.1 |
| 6,186,693 B1 * | 2/2001 | Cloyd et al. | 403/122 |
| 6,409,388 B1 * | 6/2002 | Lin | 384/49 |
| 6,467,958 B1 | 10/2002 | Sasaki et al. | |
| 6,675,478 B2 | 1/2004 | Sasaki et al. | |
| 6,960,717 B2 * | 11/2005 | Stuart et al. | 136/246 |
| 7,455,470 B2 * | 11/2008 | Brodowski | 403/135 |
| 8,136,783 B2 * | 3/2012 | Pietrzak | 248/370 |

(Continued)

FOREIGN PATENT DOCUMENTS

CN 102359482 2/2012
EP 2071102 A2 * 6/2009 ............. E04H 12/24

*Primary Examiner* — Gregory Binda
*Assistant Examiner* — Nahid Amiri
(74) *Attorney, Agent, or Firm* — Jacqueline Tadros, Esq.; Jacqueline Tadros, P.A.

(57) ABSTRACT

A low friction ball bearing tracker assembly for use in spatial object, particularly solar tracking, the assembly including a housing, having a base and top cover affixed to the housing, the housing further including a spherical chamber for receiving a rounded orb and ball bearings sufficient to surround at least fifty percent of the surface area of the orb, for allowing the orb to swivel, and translate, while tracking the spatial object, the orb being affixed to a solid shaft having an oval cross section, such as an ellipse, with major and minor axes, whereby the solid shaft holds a plate for retaining an array of panels, the top cover of the assembly further including a recessed channel along the inner circumference of the top cover to accommodate additional ball bearings to allow additional range of low friction motion.

16 Claims, 9 Drawing Sheets

(56) References Cited

U.S. PATENT DOCUMENTS

| | | |
|---|---|---|
| 8,262,487 B2 | 9/2012 | Lehmann |
| 8,297,605 B2 | 10/2012 | Lee et al. |
| 8,353,776 B2 | 1/2013 | Zhang et al. |
| 2007/0215199 A1 | 9/2007 | Dold et al. |
| 2009/0159778 A1* | 6/2009 | Yeh et al. .................. 250/203.4 |
| 2011/0132433 A1* | 6/2011 | Tanaka et al. ................ 136/246 |

* cited by examiner

BALL BEARING TRACKER ASSEMBLY

CROSS-REFERENCE TO RELATED APPLICATIONS

This application claims the benefit of pending U.S. provisional application No. 61/714,745 filed Oct. 17, 2012, the disclosure of which is incorporated herein in its entirety by reference.

BACKGROUND OF THE INVENTION

1. Field of the Invention

The present disclosure relates generally to a ball bearing tracker assembly. In particular, the invention is a ball bearing tracker assembly for the low friction movement of an array or other device for spatial object, particularly solar, tracking, whereby the ball bearing assembly includes a solid shaft with an oval or elliptical cross section and a top cover with a recessed channel having a diameter sufficient to accommodate a ball bearing diameter, thereby providing low friction rotation and angular translation.

2. Description of the Related Art

Climate change has increased the demand for green energy produced by renewable sources. Solar power in particular, is a highly valuable source of renewable energy and requires the use of solar tracking devices or systems using arrays or solar panels, to follow the motion of the sun and harness its immense power. Solar tracking systems are required for orienting a solar panel or concentrating a solar reflector or array towards the sun. Effective and efficient tracking of the sun with a panel or array of panels having a full range of motion is required in order to ensure that the maximum sunlight is captured and retained for optimal performance.

U.S. Pat. No. 6,239,353 (to Hall et al.) teaches a solar tracker that operates on a single axis, but partially simulates a dual-axis tracker by adjusting tilt angle as the tracker rotates. The tracker is disclosed in particular embodiments which fit efficiently with a hemispherical transparent dome. Hall et al.'s single-axis tracking system claims to partially emulate multiple-axis trackers that rotate about more than one axis so as to follow both the azimuth variation (progression of the sun's bearing angle, i.e. east to south to west) and the sun's change in elevation angle from the horizon. However Hall et al.'s single-axis tracking system does not provide enough range of low friction angular translation.

U.S. Pat. Appl. No. 2007/0215199 A1 (to Dold et al.) discusses a two-axis solar tracker having a base pivotally connected to a pivot frame and defines a pivot axis for movement of the solar array. A first actuator controls elevational movement and a second actuator controls azimuthal movement of the solar array. Dold et al. does not provide a low friction articulating joint or an adequate range of motion.

U.S. Pat. No. 7,455,470 (to Brodowski) discloses a ball bearing assembly. However, the mechanical structure of the ball bearing assembly of Brodowski does not provide an expansive range of motion that can accommodate high loads and is not suitable for solar tracking.

It is therefore desirable to have a ball bearing assembly having a low friction articulating joint, with sufficient range of motion to be useful for the high capture of solar energy.

SUMMARY OF THE INVENTION

In accordance with the present invention, a ball bearing tracker assembly for the low friction movement of a panel, array or other device for solar tracking is disclosed.

The assembly includes a housing having an opening for receiving a spherical orb. The housing further includes a generally hollow spherical chamber, for receiving and partially enclosing the orb within the housing. A plurality of ball bearings is positioned within the spherical chamber of the housing. When the orb is placed within the spherical chamber, the ball bearings are displaced to move around and surround the orb, thereby providing a layer of ball bearings around the orb. The ball bearings are positioned between the housing and a portion of the orb to provide low friction rotation and angular translation of the orb within the housing. The diameter of the spherical chamber taken along an axis horizontal to the opening of the housing is generally equal to the cumulative diameter of the orb, the diameter of two ball bearings, and a sufficient tolerance to allow the ball bearings to roll. The spherical chamber accommodates the orb and a ball bearing on either side of the orb when the orb is placed within the spherical chamber.

In a preferred embodiment, the chamber of the housing includes ball bearings that support and surround at least 50% of the surface area of the orb to ensure a minimally acceptable degree of stability.

The orb further includes a solid shaft, the solid shaft having an oval or elliptical cross section, the center of which attaches tangentially to the orb and is positioned on an end of the orb that is distal to a bottom portion of the housing, on a section of the orb that is not enclosed within the housing. The oval or elliptical shaft further attaches the orb to a plate and is constructed for optimal tolerance of loads, angular translation and rotation. The oval or elliptical shaft allows for swivel movement with maximum angular translation. A panel, an array of panels, or other device is thereafter mounted to the plate for low friction spatial object tracking.

The shaft includes a major axis and a minor axis, with the major axis having a length that is greater than the minor axis. The major and minor axes give a higher single axis angular translation than a (circular) single radius shaft of the same cross sectional area. The shaft is dimensioned so that its minor and major axis are of a sufficient length to clear the housing when the plate is at full angular translation in any direction. The nature of the major and minor axis of the oval or elliptical shaft allow the ball bearing tracker assembly to have the most cross sectional area for strength while providing the most range of angular translation. This is particularly well suited to solar tracking as the angular range requirements are generally less in the north-south direction than the east-west direction. The rotational ability of the device can also be utilized to provide a wide range where the highest level of translation is needed. In a preferred embodiment, the center of the shaft cross section attaches tangent to the sphere and the connection extends down over the surface of the sphere to the arc subtended by the angle of the shaft. In yet another preferred embodiment, the shaft connects to the plate with an area for construction that is elliptical and is generally larger than the elliptical cross section tangent to the orb. The elliptical area available for connection to the plate is a function of the shaft, orb, and housing dimensions.

A shaft having a major and minor axis, such as an oval or elliptical shaft can reduce the torsional stress translated to the assembly from the load of the panel or array. The shaft translates the load of the plate with panels to the ball bearing tracking assembly of the present invention so that it may move with low friction. As the load from the plate and panel or array of panels translates to the bearings and housing of the ball bearing tracking assembly of the present invention, the shaft generally becomes the critical design point as the weakest link. A shaft having a major and minor axis, such as an oval or elliptical shaft, has a smaller cross sectional area. Therefore, for a given angular translation range, the length may be reduced, resulting in lower torsional stress translated from the load of the panel or array. It is noted that the shaft must have sufficient cross sectional area for strength and should provide translation stops to prevent over ranging of the ball bearing tracker assembly.

In a preferred embodiment, the orb and shaft are manufactured in a single mold. In an alternative embodiment, the shaft may be welded to the ball. The major and minor axis of the shaft may be removably affixed to the plate and orb by fasteners or by conventional or electron beam welding The east-west angular translation generally takes place perpendicular to the minor elliptical axis. The north-south angular translation is generally represented by the major elliptical axis. The sun rises in the east and sets in the west, making the biggest arc. The north-south variation arises from the seasonal tilt of the earth relative to the sun. It also varies with the location of the site or latitude. It is appreciated that particularly in solar applications the north-south angular translation requirements are generally less than the east-west angular translation. The shaft may also be rotated to utilize the maximum translation according to daily and seasonal requirements.

A top cover seals the chamber and includes a recessed channel to receive one or more ball bearings, thereby expanding the chamber to allow for a greater range of low friction translation and rotation as the assembly of the present invention is engaged in spatial object tracking. The height of the channel includes a diameter slightly larger than a diameter of the ball bearing, such that the diameter of the channel is sufficient to accommodate the diameter of a ball bearing when a plurality of ball bearings is directed into the channel. In a preferred embodiment, the channel accommodates a plurality of ball bearing when the ball is engaged in maximum angular translation and rotation, thereby allowing the ball bearing to move into the recessed channel for increased range of low friction motion.

In a preferred embodiment, the top cover includes a portion above the recessed channel, having a thickness that is sufficient to maintain stability of the ball bearing tracker assembly, relative to the dimensions of the orb, elliptical shaft and plate. In an alternative embodiment, the top cover may be composed of a single unitary section. In another alternative embodiment, the top cover may be comprised of two or more sections.

The ball bearing tracker assembly may be mounted to a pole, platform or roof, so that the extremities of the panel, array or other device clear obstructions. The movement of the panel, array or other device, may be adjusted by an actuator, electrically, mechanically, manually or by a combination thereof.

It is an object of the invention to provide a low friction articulating joint, with a sufficient range of motion to be useful for the high capture of solar energy.

It is another object of the invention to provide, a ball bearing tracker assembly having a solid shaft having a major and minor axis, such as an oval or elliptical shaft, to maximize the range of rotation and angular translation.

It is yet another object of the invention to provide, a ball bearing tracker assembly having a channel for receiving a plurality of ball bearings within the channel to provide low friction, rotation and angular translation of the assembly.

It is yet another advantage of the present invention to be able to track the sun throughout the day.

Another advantage of the present invention is it allows the solar tracker to automatically provide for seasonal adjustments.

It is an advantage of the invention to provide a housing with a top cover having an expanded recessed channel in order to effectively expand the spherical chamber of the housing by allowing a plurality of ball bearings to roll into the recessed channel within the top cover in a generally side to side configuration for an increased degree of angular translation and rotation.

An additional advantage of the invention is that the major and minor axis of the shaft of the ball bearing tracker assembly provides the most shaft cross sectional area for strength while providing a high range of translation in a single direction that can be further utilized by the ability of the ball bearing tracker assembly of the present invention to rotate and swivel.

Another advantage of the present invention is that the low friction movement allows for less expensive and less energy intensive drives to moves the array.

The summary of the present invention will become readily apparent upon further review of the following specifications and drawings.

DETAILED DESCRIPTION OF THE PREFERRED EMBODIMENTS

Figure 1:
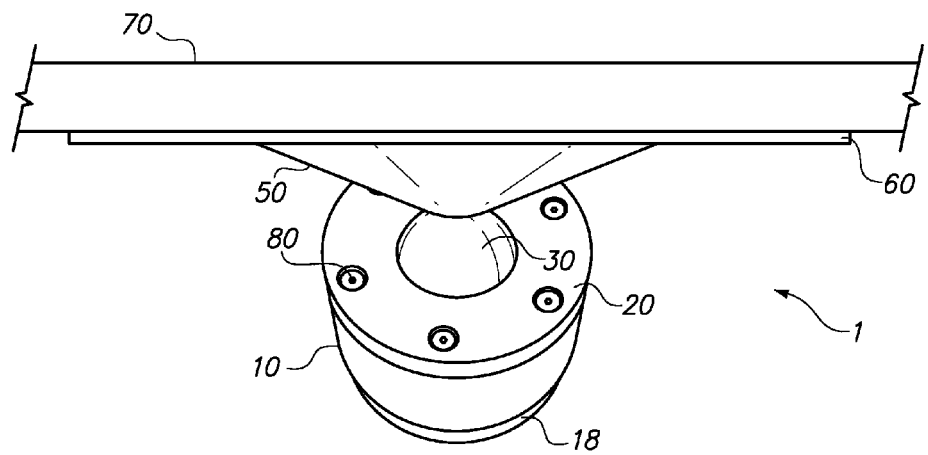
FIG. 1 is a perspective view of the ball bearing tracker assembly of the present invention with the plate in an offset position.

The ball bearing tracker assembly 1, includes a housing 10 having a top rim 12, the top rim 12 of the housing 10 having a generally circular opening 14, wherein the circular opening 14 provides access to a generally spherical hollow chamber 16 within the housing 10. The circular opening 14 is dimensioned for receiving a substantially rounded orb 30 for placement within the spherical chamber 16. The orb 30 further including a solid oval or elliptical shaft 50 tangentially attached to a first portion of the orb 30, whereby the shaft 50 emerges beyond the circular opening 14 of the rim 12 when the orb 30 is housed within the spherical chamber 16, the shaft 50 further attaches the orb 30 to a plate 60 on which is mounted one or more panels 70 for solar tracking. The shaft 50 includes an oval cross section, such as an ellipse, with a major axis 52 and a minor axis 54, whereby the major axis 52 of the shaft 50 generally directs the navigation of the plate 60 along a north-south angular translation and the minor axis 54 of the elliptical shaft 50 generally directs the navigation of the plate along an east-west angular translation. The shaft 50 is dimensioned so that each it is of a sufficient length to clear the housing 10 when the plate 60 is at full angular translation in any of the north, south, east or west directions.

The assembly 1 of the present invention further includes a plurality of ball bearings 40 within the spherical chamber 16 of the housing 10, whereby the ball bearings 40 are displaced to surround a second portion of the orb 30 when the orb 30 is housed within the spherical chamber 16. The ball bearings 40 arranged between the spherical chamber 16 of the housing 10 and the second portion of the orb 30 support and roll with the orb 30 for low friction rotation and angular translation of the orb 30 within the spherical chamber 16 when the assembly 1 is engaged in solar tracking.

A top cover 20 attaches to the top rim 12 of the housing 10. The top cover 20 forms a generally circular aperture 22 positioned substantially at the center of the top cover 20. The top cover 20 further includes a top surface 23 and a bottom surface 24, wherein the top surface 23 of the top cover 20 encircles an upper segment of the orb 30, along an inner circumference of the top surface 23, when the orb 30 is housed within the spherical chamber 16 and the top cover 20 is secured to the top rim 12, and wherein the bottom surface 24 of the top cover 20 encircles an upper segment of the spherical chamber 16 of the housing 10 when the top cover 20 is secured to the rim 12. The bottom surface of the top cover 24 further including a generally curved slope 25 positioned along a lip 26 of the bottom surface 24 of the top cover 20 along a region most proximate to the upper segment of the spherical chamber 16, whereby the curved slope 25 of the lip 26 acts as a conduit for providing access to a recessed channel 27 located between the top and bottom surface 23, 24, of the top cover 20. The recessed channel 27 includes a height, D3, dimensioned for receiving a ball bearing 40 within the channel 27. The channel 27 further includes a depth, D7 dimensioned for accommodating a plurality of ball bearings 40, wherein the ball bearings 40 are positioned generally side to side in one or more rows within the recessed channel 27 thereby providing an increased degree of angular translation and rotation of the orb 30.

The assembly 1 of the present invention further includes a base 18 at a bottom portion of the housing 10, distal to the top rim 12 of the housing 10. The assembly further includes fastening means 80 for affixing the top cover 20 to the top rim 12 of the housing 10.

Referring now to FIGS. 1-9, the ball bearing tracker assembly 1 of the present invention is composed of the housing 10, the base 18 and the top cover 20. The housing 10 further includes the generally circular opening 14 having a diameter D2, the circular opening 14 of the top rim 12. The spherical chamber 16 has a diameter D1 measured along an axis horizontal to the opening 14 that is dimensioned for accommodating a diameter D4 of the substantially rounded orb 30 in addition to a diameter D5 of each ball bearing 40 on either side of the orb 30 within the spherical chamber 16, such that D1 is substantially equal to the sum of D4 and two times D5.

As shown in FIGS. 4-5, 7A-7B, a plurality of the ball bearings 40 are arranged within the chamber 16. The ball bearings 40 support the orb 30 when it is placed in the chamber 16. The ball bearings 40 allow for low friction translation and rotation of the orb 30 within the chamber 16. The volume of the chamber 16 should be sufficient to accommodate the ball bearings 40 and the orb 30 and sufficient tolerance to allow for low friction rotation and angular translation of the orb 30 within the chamber 16. In a preferred embodiment, the chamber 16 of the housing 10 includes ball bearings 40 that support and surround at least fifty percent of the surface area of the orb 30. To ensure a minimally acceptable degree of stability, a fill space covering at least fifty percent of the entire surface area of the orb 30 is needed for stability of the ball bearing tracking assembly 1.

Figure 2:
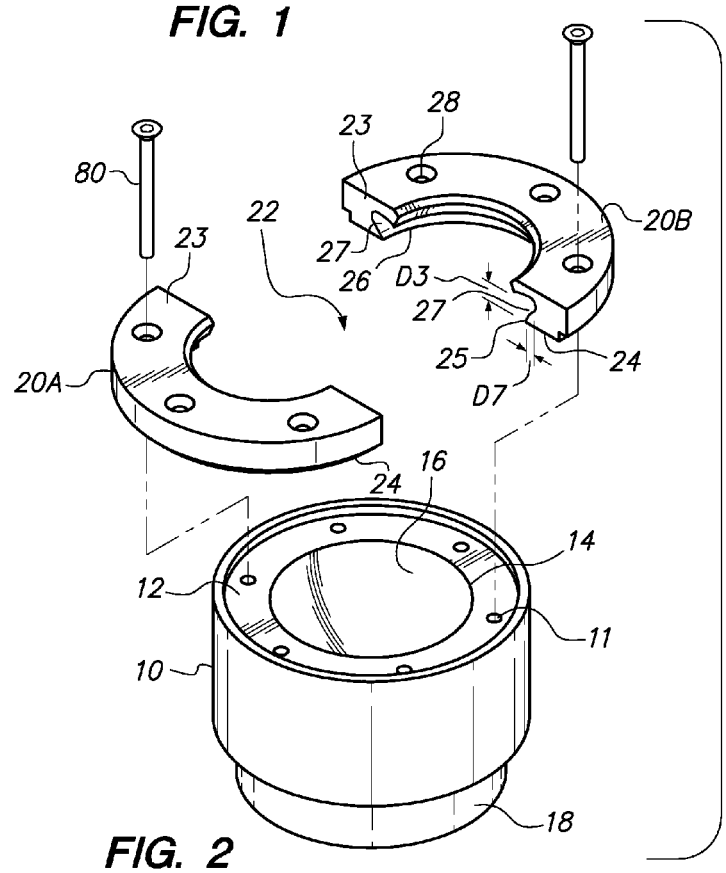
FIG. 2 is a perspective view of the interior of the top cover and the housing of the ball bearing tracker assembly of the present invention illustrating the channel within the top cover and the generally spherical interior chamber of the housing.

As shown in FIG. 2, the top cover 20 comprises the generally circular aperture 22, positioned substantially at a center point of the top cover 20. The top cover 20 further includes the top surface 23, and the bottom surface 24. The top surface 23 of the top cover 20 is dimensioned to encircle and fit securely around the upper segment of the orb 30 when the orb 30 is housed within the chamber 16 and the top cover 20 is secured to the rim 12 of the housing 10. The bottom surface 24 of the top cover 20 is dimensioned to encircle and fit securely around an upper segment of the spherical chamber 16 of the housing 10. In an alternative embodiment, the top cover 20 includes a beveled edge 56 positioned along a circumference of the top cover 20 proximate to the circular aperture 22 as shown in FIG. 2.

Figure 7A:
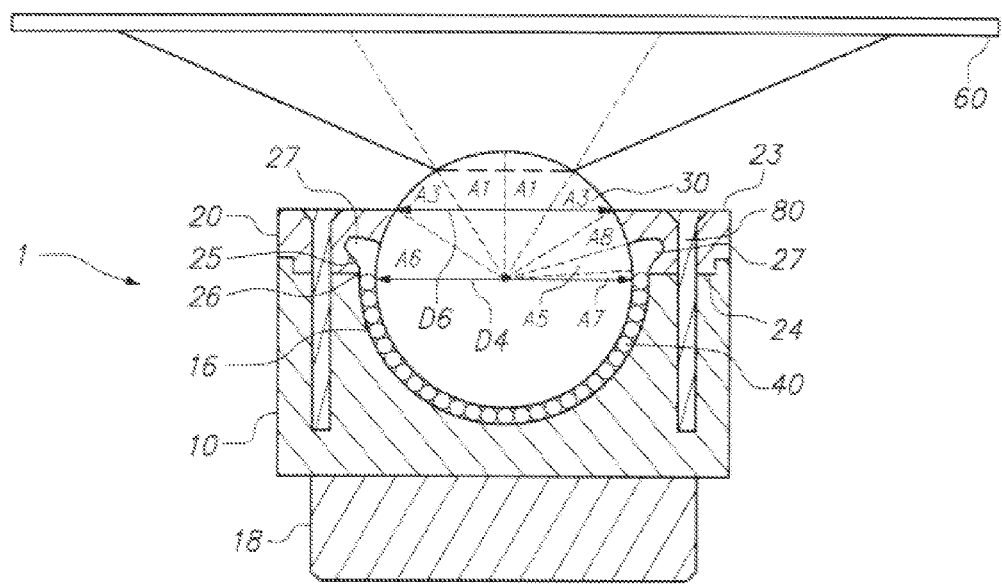
FIG. 7A is a sectional cutaway view of the ball bearing tracker assembly of the present invention with the plate taken along the major axis of the elliptical shaft illustrating the various angular characteristic of the device with the plate positioned in a horizontal position relative to the top surface of the housing and showing the angle of translation.
Figure 7B:
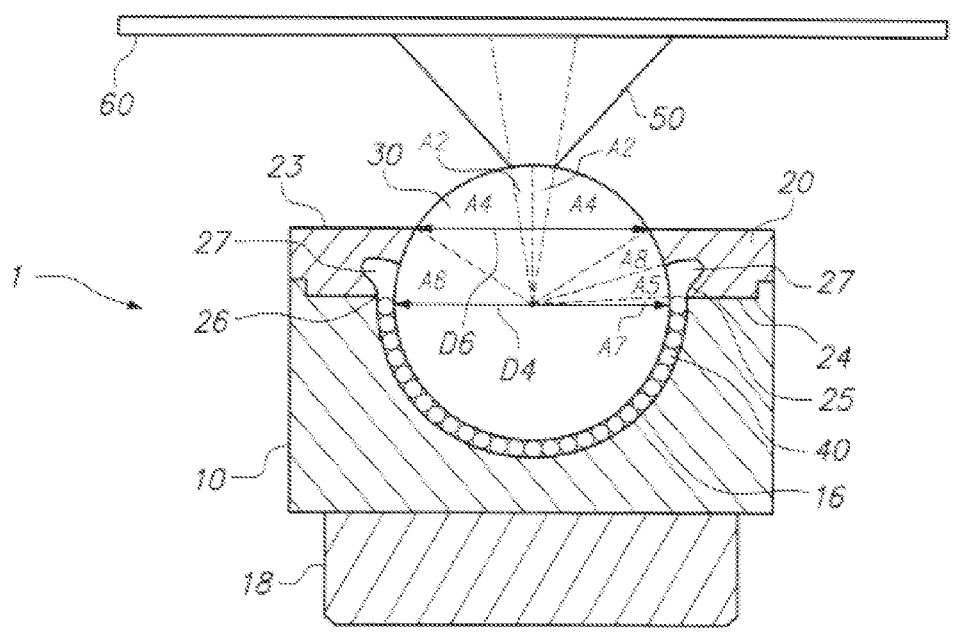
FIG. 7B is a sectional cutaway view of the ball bearing tracker assembly of the present invention with the plate taken along the minor axis of the elliptical shaft illustrating the various angular characteristics of the device with the plate positioned in a horizontal position relative to the top surface of the housing and showing the angle of translation.
Figure 8:
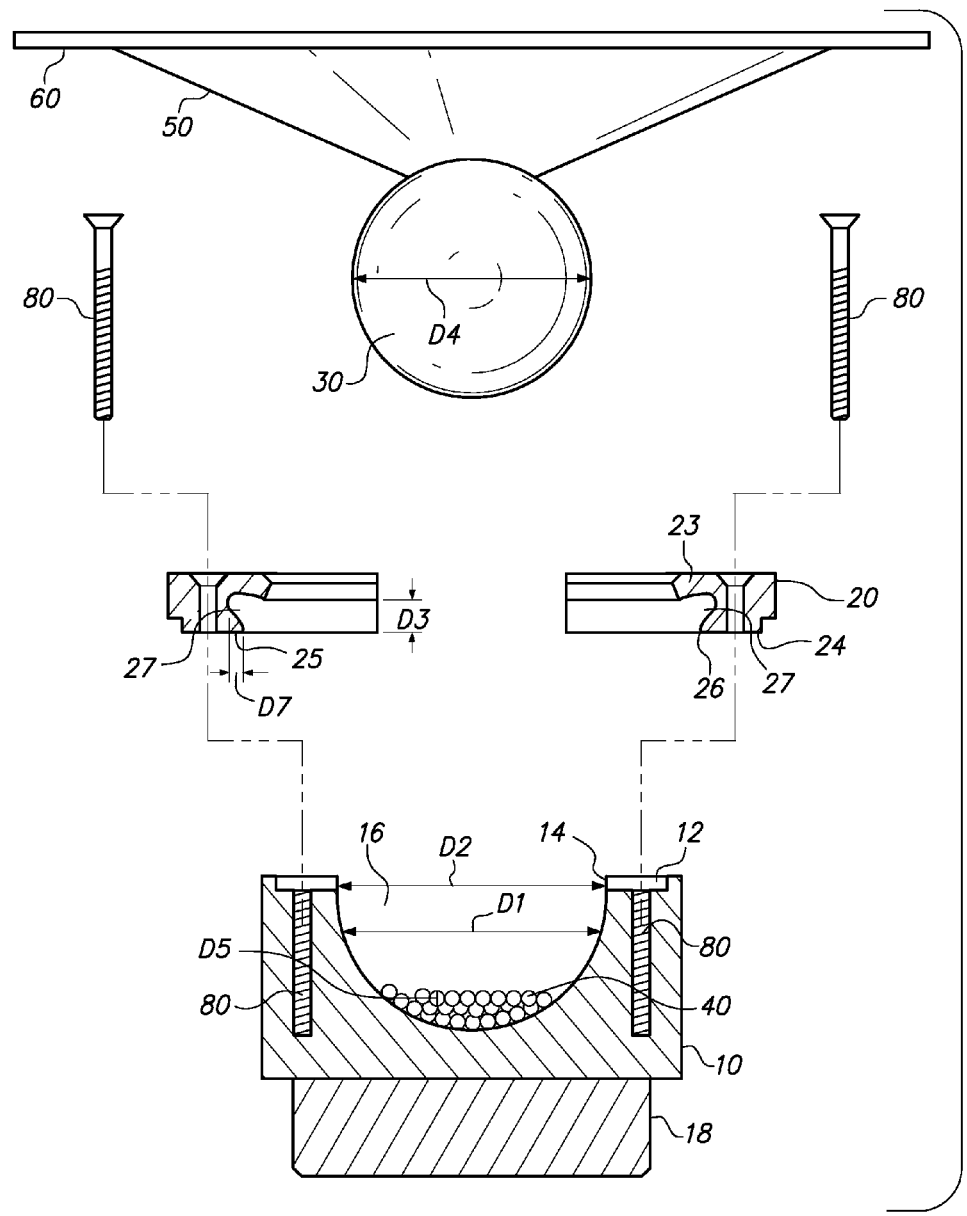
FIG. 8 is an exploded view of the ball bearing tracker assembly of the present invention illustrating the spherical chamber prior to the insertion of the orb with elliptical shaft.

As shown in FIGS. 4, 5, and 7-10, the bottom surface 24 of the top cover 20 includes the generally curved slope 25 positioned along a circumference of the lip 26 of the bottom surface 24 of the top cover 20 most proximate to an upper segment of the spherical chamber 16, whereby the curved slope 25 of the lip 26 acts as a conduit for providing access to the recessed channel 27 between the top surface 23 and bottom surface 24 of the top cover 20. The recessed channel 27 having a height, D3 dimensioned for receiving at least one ball bearing 40, such that D3 is slightly larger than the diameter D5 of the ball bearings 40 to allow the ball bearings 40 to be received within the channel 27. The recessed channel 27 further includes a depth D7 dimensioned to receive a plurality of ball bearings 40, wherein the ball bearings 40 are positioned in one or more rows, in a substantially side by side configuration when the shaft 50 and orb 30 of the assembly 1 are in angular translation and rotation as shown in FIGS. 4-5 and 9-10, thereby providing for additional low friction angular translation and rotation of the orb 30 when the assembly 1 of the present invention is engaged in spatial object tracking, such as solar tracking. The curved slope 25 is further angled at a gradient to facilitate the rolling of the ball bearings 40 back into the spherical chamber 16 from the recessed channel 27 as the shaft 50 and orb 30 of the assembly 1 pivot from a position of angular translation and rotation to a position wherein the plate is substantially horizontal relative to the top cover as illustrated in FIGS. 6-8.

In accommodating additional ball bearings 40 the recessed channel 27 provides additional range for low friction movement of the orb 30 within the assembly 1.

As shown in FIG. 2, in an alternative embodiment, the top cover 20 comprises two semi circular arcs 20A and 20B whereby one semicircular arc 20A is substantially "C" shaped and a complimentary semi circular arc 20B is substantially shaped as a mirror image, in reverse "C" as shown in FIG. 2.

In one embodiment, the top cover 20 includes a plurality of holes 28 for receiving fastening means 80 for affixing the top cover 20 to the housing 10. The rim 12 of the housing 10 includes a plurality of bores 11 complimentarily aligned with the holes 28 of the top cover 20 for receiving the fastening means 80 when the top cover 20 is affixed to the housing 10.

Figure 3:
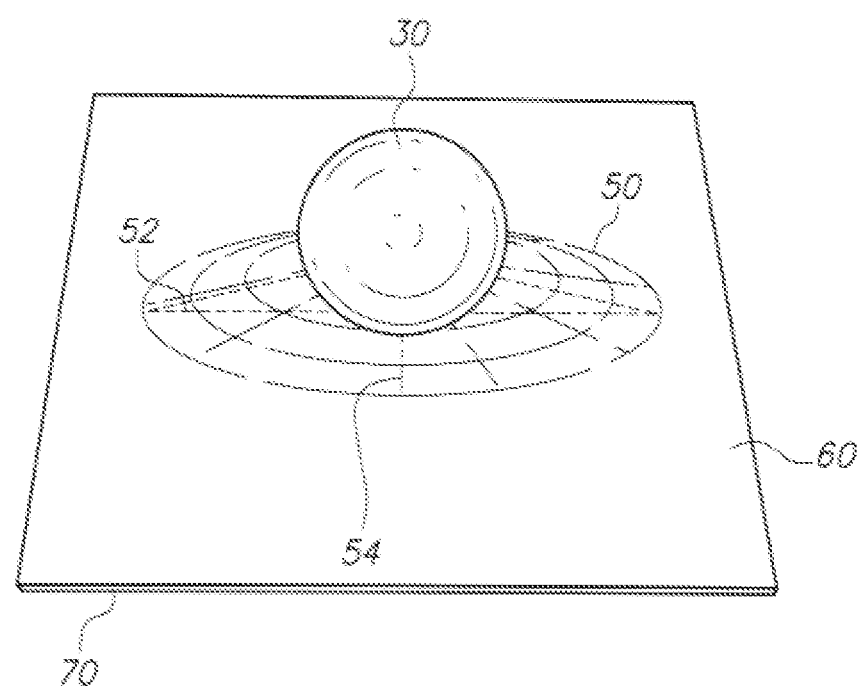
FIG. 3 is a bottom view of the orb outside the housing the assembly of the present invention, illustrating the major axis, and a portion of the minor axis, of the elliptical shaft secured to a plate.

Referring now to FIG. 3, the solid shaft 50 is affixed to the orb 30 and includes an oval cross section having major and minor axis, 52, 54, such as for example, an ellipse. The shaft 50 allows for maximum swivel movement, as well as the highest range of angular translation and rotation.

The shaft 50 attaches the orb 30 to a plate 60 on which may be mounted one or more panels 70 for low friction spatial object tracking.

In another preferred embodiment, the shaft 50 attaches to the orb 30. The shaft 50 may be affixed to the orb 30 using fastening means. In an alternative embodiment, the shaft 50 is connected to the orb 30 by conventional or electron beam welding. In yet, another preferred embodiment, the ball 30 and shaft 50 are manufactured as a single unit. In another preferred embodiment, the shaft 50 is connected to the plate 60 through an ellipse tangent to the orb 30.

The major 52 and minor 54 axis of the shaft 50 of the present invention allow for maximum range for spatial object, and in particular for solar tracking as there may be different limits in the east-west and north-south directions. Thus, for example in the case of solar tracking, the major 52 and minor 54 axis of the shaft 50 allow the panel 70 or array of panels to have a full range of motion as is required in order to ensure that the maximum sunlight is captured and retained for optimal performance.

The ball bearing tracker assembly 1 may be mounted to a pole, platform or roof, so that the extremities of the panels 70 or array of panels will clear obstructions.

It is noted that the thickness of the top cover 20 is a function of the length of the elliptical shaft 50, such that if the thickness of the top cover 20 is increased, the length of the elliptical shaft 50 will also have to increase in order to maintain the required range of motion. Conversely, if the length of the shaft 50 is increased, the minimum required thickness of the top cover 20 generally increases.

FIG. 1 shows a perspective view of the ball bearing tracker assembly 1 of the present invention with the plate 60 in an offset position.

Referring now to FIG. 2 there is shown a perspective view of the interior of the housing 10 of the ball bearing tracker assembly 1 of the present invention illustrating the generally spherical interior chamber 16 of the housing 10. FIG. 2 also illustrates the top cover 20 in one embodiment having two segments, 20A and 20B. As shown, the inner aperture 22 of the top cover 20 is in the center of the top cover 20 when 20A and 20B are joined together to form the cover 20.

FIG. 3 is a bottom view of the orb 30 outside the housing 10 of the assembly 1 of the present invention, illustrating the major axis 52, and a portion of the minor axis 54, of the shaft 50 secured to a plate 60.

Figure 4:
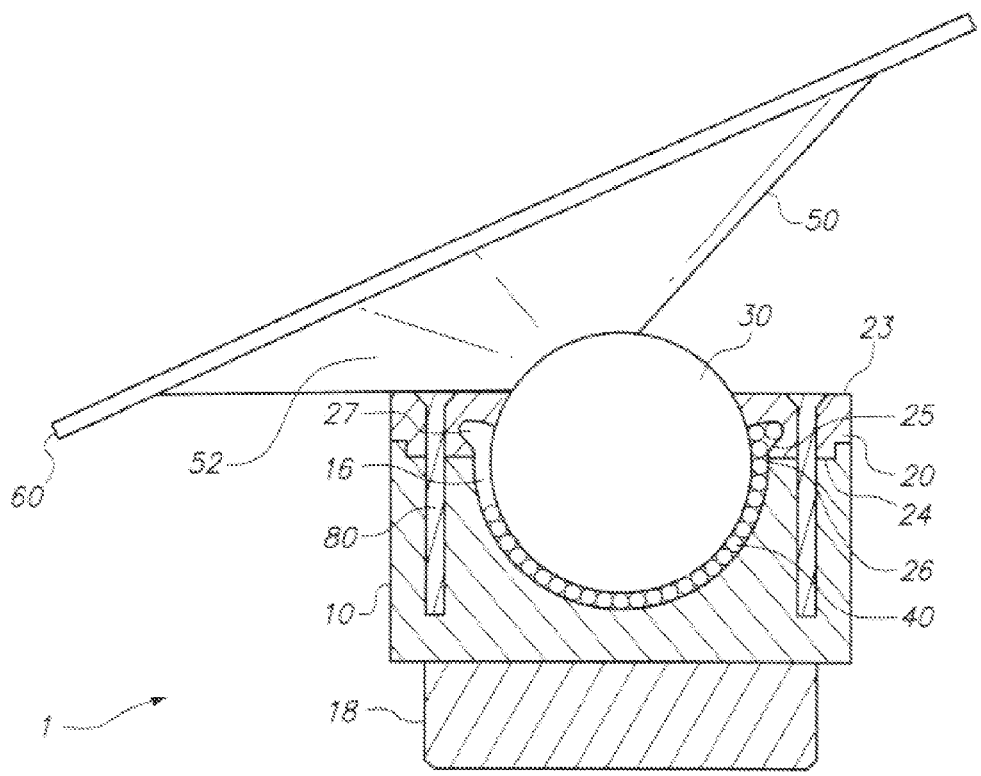
FIG. 4 is a sectional cutaway view of the ball bearing tracker assembly of the present invention with the plate taken along the major axis of the elliptical shaft illustrating the plate in a fully angular translated position along a north-south direction.

FIG. 4 is a sectional cutaway view of the ball bearing tracker assembly 1 of the present invention with the plate 60 taken along the major axis 52 of the shaft 50 illustrating the orb 30, shaft 50 and plate 60 in a fully angular translated position. The shaft 50 is shown with the maximum space available for construction.

Figure 5:
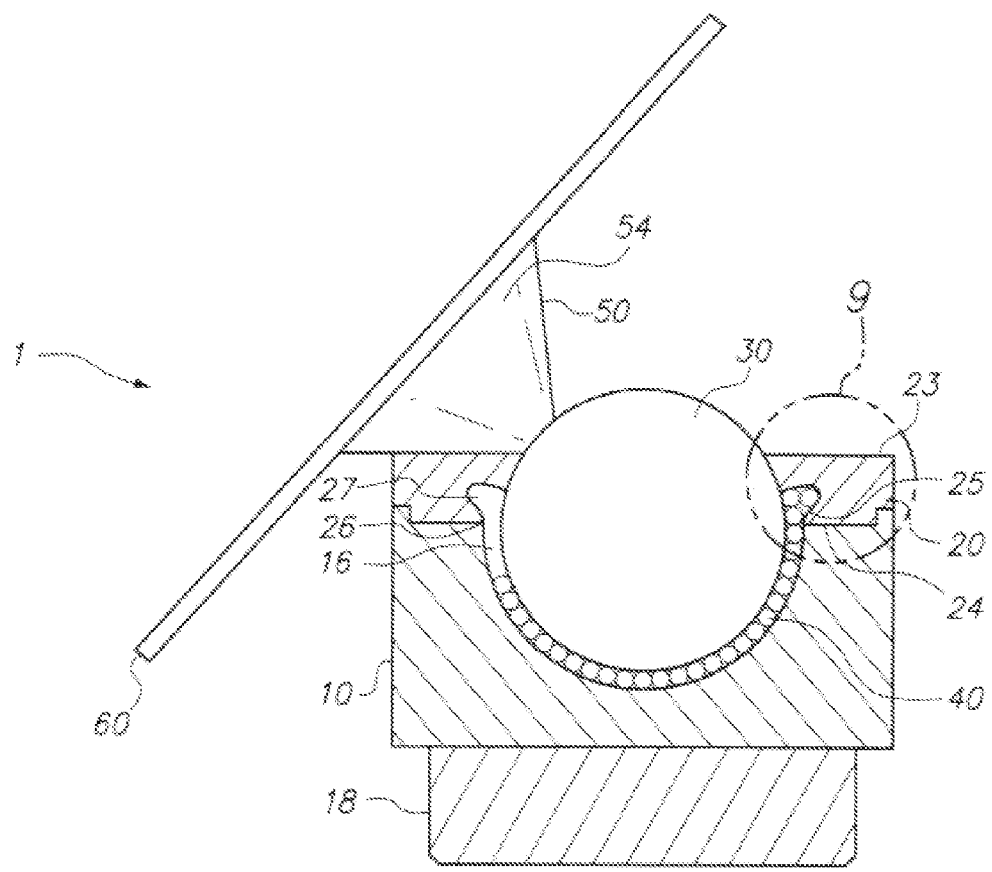
FIG. 5 is a sectional cutaway view of the ball bearing tracker assembly of the present invention with the plate taken along the minor axis of the elliptical shaft illustrating the plate in a fully angular translated position along an east-west direction.

Now referring to FIG. 5 is a sectional cutaway view of the ball bearing tracker assembly 1 of the present invention with the plate 60 taken along the minor axis 54 of the shaft 50 illustrating the plate 60 in a fully angular translated position. The shaft 50 is shown with the maximum space available for construction.

Figure 6A:
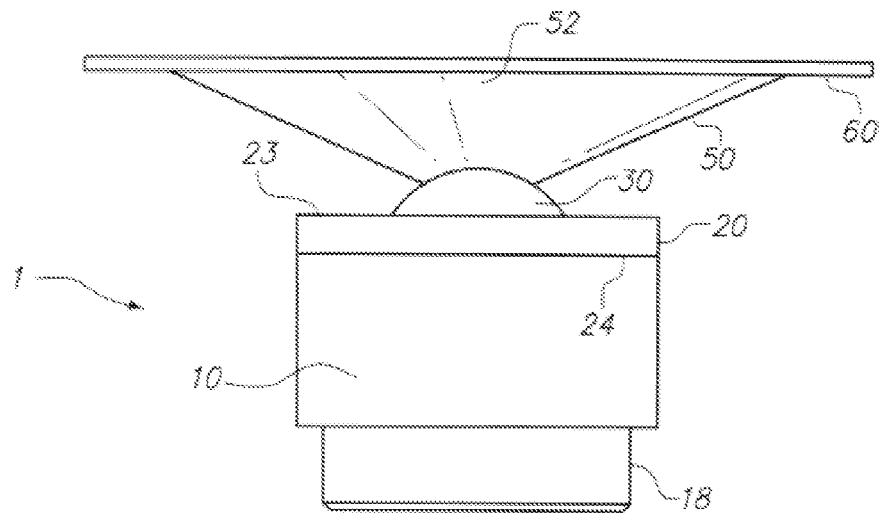
FIG. 6A is front view of the ball bearing tracker assembly of the present invention with the plate taken along the major axis of the elliptical shaft illustrating the plate positioned in a horizontal position relative to the top surface of the housing.

FIG. 6A is a front view of the ball bearing tracker assembly 1 of the present invention with the plate 60 taken along the major axis 52 of the shaft 50 illustrating the plate 60 positioned in a horizontal position relative to the top cover 20 of the housing 10.

Figure 6B:
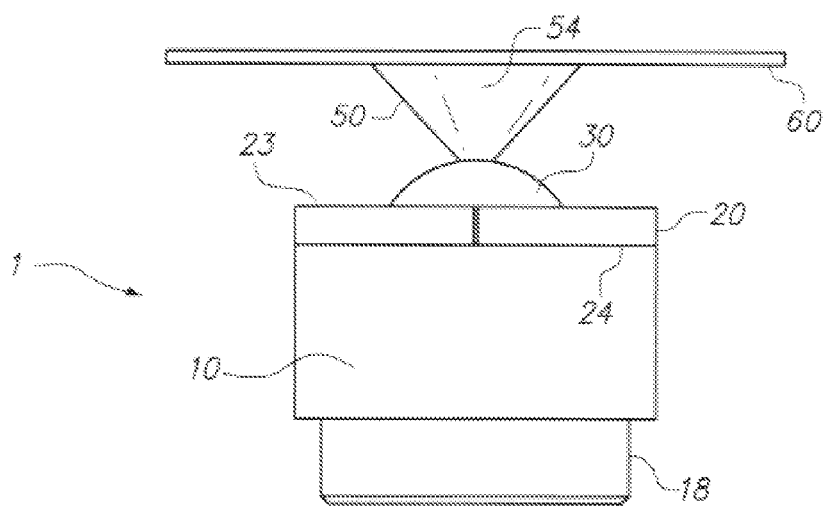
FIG. 6B is front view of the ball bearing tracker assembly of the present invention with the plate taken along the minor axis of the elliptical shaft illustrating the plate positioned in a horizontal position relative to the top surface of the housing.

Referring to FIG. 6B there is shown a front view of the ball bearing tracker assembly 1 of the present invention with the plate 60 taken along the minor axis 54 of the shaft 50 illustrating the plate 60 positioned in a horizontal position relative to the rim 12 of the housing 10.

FIG. 7A is a center sectional cutaway view of the ball bearing tracker assembly 1 of the present invention with the plate 60 taken along the major axis 52 of the shaft 50 illustrating the plate 60 positioned in a horizontal position relative to the top rim 12 of the housing 10 and showing the angle of translation. The major axis shaft angle A1 refers to the major axis of the tangential ellipse.

FIG. 7B is a center sectional cutaway view of the ball bearing tracker assembly 1 of the present invention with the plate 60 taken along the minor axis 54 of the shaft 50 illustrating the plate positioned in a horizontal position relative to the top rim 12 of the housing 10 and showing the angle of translation. The minor axis shaft angle A2 refers to the minor axis of the tangential ellipse.

Referring now to FIGS. 7A and 7B, the obstructed translation angle, A3 is the angle obstructed by an inner diameter D6 of the top cover 20 being smaller than the diameter D4 of the orb 30. The remaining angle consists of the angular translation angle, A3 for the major and A4 for the minor axis, and the shaft angle, A1 for the major and A2 for the minor axis. The shaft angles A1 and A2 define the shaft attachment area as well as the minimum cross sectional area of the shaft that exists at the arc of the orb 30 that is subtended by the shaft angles.

In a preferred embodiment, the free space angle A5 is at least equal to the average of the major and minor axis angular translations, A1, A2. The free space angle A5 is defined within the obstructed translation angle A6. The angle of fill (over the minimum 50%) of the ball bearings in the chamber is defined as the fill angle A7. The remaining angle of the chamber is defined as the free space angle A5. The obstructed angle above the chamber is the designated as the obstructed fill angle A8. If the free space angle A5 is less than the average maximum translational angle of the major and minor axis, the expanded chamber become more critical to the operation of the device and should be designed to provide the additional free space. If the chamber cannot be made to provide sufficient free space, the low friction range of the device may be limited.

FIG. 8 is an exploded view of the ball bearing tracker assembly 1 of the present invention illustrating the spherical chamber 16 approximately fifty percent filled with ball bearings 40 prior to the displacement of the ball bearings 40 and the insertion of the orb 30 with shaft 50.

Figure 9:
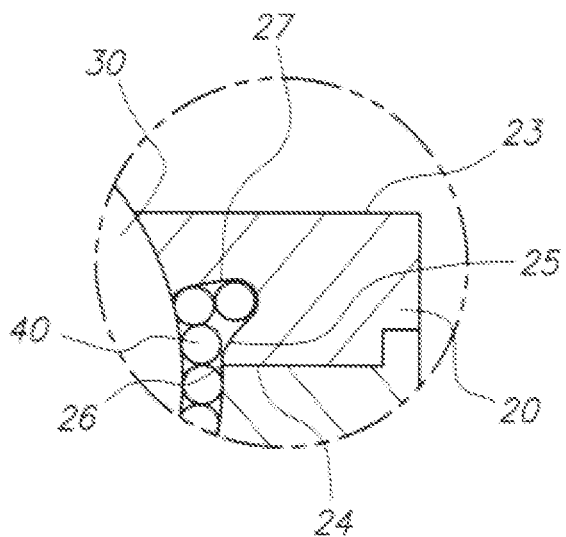
FIG. 9 is a close up view of an alternative embodiment of the recessed channel of the top cover as shown in FIG. 5, illustrating the top cover of the present invention with a recessed channel capable of receiving two ball bearings in a substantially side by side configuration.

FIG. 9 is a close up view of an alternative embodiment of the recessed channel 27 of the top cover 20 as shown in FIG. 5, illustrating the top cover 20 of the present invention with a recessed channel 27 capable of receiving two ball bearings 40 in a substantially side by side configuration.

Figure 10:
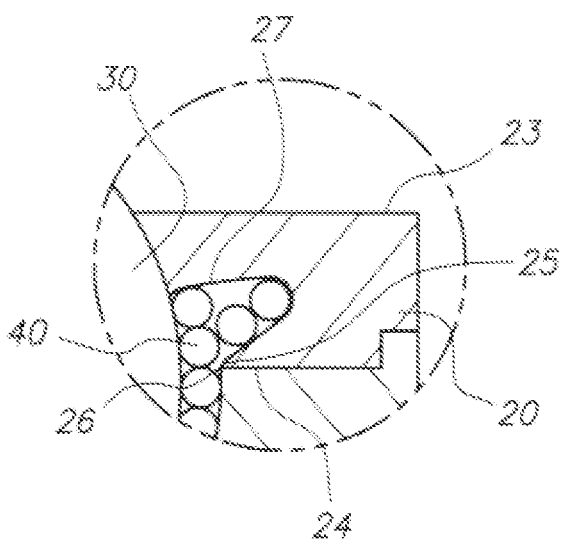
FIG. 10 is a close up view of an alternative embodiment of the recessed channel of the top cover as shown in FIG. 5, illustrating the top cover of the present invention with a recessed channel capable of receiving three ball bearings in a substantially side by side configuration.

FIG. 10 is a close up view of an alternative embodiment of the recessed channel 27 of the top cover 20 as shown in FIG. 5, illustrating the top cover 20 of the present invention with a recessed channel 27 capable of receiving three ball bearings 40 in a substantially side by side configuration.

Thus, while there has been shown and described, fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A ball bearing tracker assembly, for solar tracking, the ball bearing assembly comprising: a housing including a top rim, the top rim of the housing having a generally circular opening, wherein the circular opening provides access to a generally spherical hollow chamber within the housing, the circular opening dimensioned for receiving a substantially rounded orb within the spherical chamber, the orb further including a solid elliptical shaft attached to a first portion of the orb, on a section of the orb not enclosed within the housing, whereby the elliptical shaft emerges beyond the circular opening of the rim when a second portion of the orb is housed within the spherical chamber, the elliptical shaft further attaches the orb to a plate on which is mounted one or more panels for solar tracking, the shaft includes an oval cross section having a major axis and a minor axis, whereby the major axis of the shaft generally directs the navigation of the plate along a north-south angular translation and the minor axis of the shaft generally directs the navigation of the plate along an east-west angular translation, the shaft is dimensioned so that each of the minor and major axes are of a sufficient length to clear the housing when the plate is at full angular translation in any of the north, south, east or west directions; and a plurality of ball bearings within the spherical chamber of the housing, whereby the ball bearings are displaced to surround a second portion of the orb when the orb is housed within the spherical chamber, the ball bearings arranged between the housing and the second portion of the orb support and surround the orb to provide low friction rotation and angular translation of the orb within the spherical chamber when the assembly is engaged in solar tracking.

2. The ball bearing tracker assembly of claim 1, further including a top cover for attaching to the top rim of the housing, the top cover including a generally circular aperture positioned substantially at the center of the top cover, the top cover further including a top surface and a bottom surface, wherein the top surface of the top cover encircles an upper segment of the orb when the orb is housed within the spherical chamber and the top cover is secured to the top rim, and wherein the bottom surface of the top cover encircles an upper segment of the spherical chamber of the housing when the top cover is secured to the top rim, the bottom surface of the top cover further including a generally curved slope positioned along a circumference of a lip of the bottom surface of the top cover along a region most proximate to the upper segment of the spherical chamber, whereby the curved slope of the lip acts as a conduit for providing access to a recessed channel located between the top and bottom surface of the top cover, the recessed channel having a height dimensioned for receiving a ball bearing and a depth dimensioned to accommodate at least one additional ball bearing.

3. The ball bearing tracker assembly of claim 2, wherein and the recessed channel includes a depth dimensioned to accommodate a plurality of ball bearings with an allowance for each the ball bearings to roll, such that the ball bearings are generally aligned in a side by side configuration, to allow for additional angular rotation or translation of the orb.

4. The ball bearing tracker assembly of claim 2, wherein the curved slope is angled at a gradient to facilitate the rolling of the ball bearings back into the spherical chamber from the recessed channel as the shaft and orb of the assembly pivot from a position of angular translation and rotation to a position wherein the plate is substantially horizontal relative to the top cover.

5. The ball bearing tracker assembly of claim 2, further including means for fastening the top cover to the top rim of the housing.

6. The ball bearing tracker assembly of claim 2, wherein the top cover includes a beveled edge positioned along a circumference of the top cover, proximate to the circular aperture.

7. The ball bearing tracker assembly of claim 1, further including a base affixed to bottom portion of the housing and distal to the top rim of the housing.

8. The ball bearing tracker assembly of claim 1, wherein a diameter of the hollow spherical chamber taken along an axis horizontal to the circular opening of the housing is generally equal to the sum of a diameter of the orb and a diameter of each of two ball bearings, with an allowance for each the ball bearings to roll.

9. The ball bearing tracker assembly of claim 1, wherein the ball bearings contact and surround and support at least fifty percent of the surface area of the orb to ensure a minimally acceptable degree of stability of the assembly.

10. The ball bearing tracker assembly of claim 1, wherein the orb and shaft are manufactured in a single mold.

11. The ball bearing tracker assembly of claim 1, wherein the shaft is welded to the orb.

12. The ball bearing tracker assembly of claim 1, wherein the shaft is removably affixed to the orb.

13. The ball bearing tracker assembly of claim 1, wherein the one or more panels are configured to form an array of panels, whereby the array of panels is mounted to the plate for tracking the movement of the sun for the capture of solar energy.

14. The ball bearing tracker assembly of claim 1, wherein the top cover includes a plurality of holes and is affixed to the housing using fastening means.

15. The ball bearing tracker assembly of claim 1, wherein the top cover comprises two semi circular arc segments, whereby a first semicircular arc segment is substantially "C" shaped and a second complimentary mirror image semi circular arc segment is substantially shaped as a reverse "C".

16. The ball bearing tracker assembly of claim 1, wherein the assembly is mounted on a structure, for allowing panels on the plate to clear obstructions.

* * * * *